United States Patent
Ng et al.

[11] Patent Number: 5,255,013
[45] Date of Patent: Oct. 19, 1993

[54] MULTIPLE ADDRESS GREY LEVEL LED PRINTING WITH BINARY ARCHITECTURED PRINTHEAD

[75] Inventors: Yee S. Ng, Fairport; Hurjay Yeh; Joseph M. Basile, both of Rochester, all of N.Y.

[73] Assignee: Eastman Kodak Company, Rochester, N.Y.

[21] Appl. No.: 609,868

[22] Filed: Nov. 7, 1990

[51] Int. Cl.[5] .................. G01D 15/14; H04N 1/23
[52] U.S. Cl. .................... 346/107 R; 358/298
[58] Field of Search ............ 346/107 R, 160, 154, 346/157, 1.1; 358/298

[56] References Cited

U.S. PATENT DOCUMENTS

| | | | |
|---|---|---|---|
| 4,074,318 | 2/1978 | Kapes, Jr. | 358/302 X |
| 4,074,319 | 2/1978 | Goldschmidt et al. | |
| 4,074,320 | 2/1978 | Kapes, Jr. | |
| 4,455,562 | 6/1984 | Dolan et al. | 346/154 |
| 4,525,729 | 6/1985 | Agulnek et al. | 346/107 R X |
| 4,532,523 | 7/1985 | Tanaka | 346/76 PH |
| 4,630,068 | 12/1986 | Ims | |
| 4,750,010 | 6/1988 | Ayers et al. | |
| 4,779,102 | 10/1988 | Sasaki | |
| 4,806,950 | 2/1989 | Sekine et al. | |
| 4,835,551 | 5/1989 | Ng | |
| 4,855,760 | 8/1989 | Kanayama | |
| 4,897,639 | 1/1990 | Kanayama | 346/107 R X |
| 4,963,989 | 10/1990 | Morton | 358/298 |
| 5,025,322 | 1/1991 | Ng | 358/298 |
| 5,138,337 | 8/1992 | Ng | 346/107 R |

FOREIGN PATENT DOCUMENTS 0375431 12/1989 European Pat. Off.
WO88100/42 5/1988 PCT Int'l Appl.

OTHER PUBLICATIONS

Abiko, Nakamura, Chiba, and Nihei, "High Printing Quality LED Printheads", Journal of Imaging Technology, v. 12, No. 5, pp. 296-299, Oct. 1986.

Primary Examiner—Mark J. Reinhart
Assistant Examiner—David Yockey
Attorney, Agent, or Firm—Norman Rushefsky

[57] ABSTRACT

An LED Printhead having a row of LED's includes a binary architectured driver that drives each LED on for a series of sub-intervals related to a series of binary weighted recording clocking pulses to record a grey level pixel in accordance with an appropriate series of data bits latched in the driver. The series of data bits are formatted for presentation to the driver by a retransmit line buffer which transmits n times the data of one line of grey level pixels represented by n bits each to a process correction look-up table. Another look-up table provides a signal to the process look-up table as to the intensity characteristics of the particular LED which is to print the pixel. The corrected grey level data is then input to a multiplexer which selects one of the n bits for printing in accordance with count signals related to the binary weight of the recording clock pulses.

8 Claims, 5 Drawing Sheets

MULTIPLE ADDRESS GREY LEVEL LED PRINTING WITH BINARY ARCHITECTURED PRINTHEAD

BACKGROUND OF THE INVENTION

1. Field of the Invention

The present invention relates to non-impact printing apparatus and method for recording using printheads having a plurality of recording elements such as light-emitting diodes (LED's) or the like.

2. Brief Description of the Prior Art

In U.S. Pat. No. 4,074,319 a printhead employing linear arrays of LED's for recording is described. Light from selective illuminated LED's impinges upon a photosensitive surface such as a photographic film or electrostatically charged photoconductor to form a latent image. This image may be developed by conventional known means to form a visible image. In forming images that vary in density it is further known to adjust the size or density of each picture element (pixel) recorded by each LED in steps so that certain pixels may be said to have greater grey levels than other pixels. In recording a grey level pixel, the pixel may be recorded for a single timed duration that varies with a signal representing this time duration as, for example, disclosed in U.S. application Ser. No. 290,002. Another approach disclosed in U.S. Pat. No. 4,074,319 employs a series of rapid flashes to record a single pixel wherein flashes may be either of uniform duration or of varying or binary weighted duration.

The invention described herein relates to the latter type of grey level recording wherein each pixel is recorded using a series of pulses, except of course for those pixels requiring only a minimum of exposure by only a single flash of the respective LED. The invention further relates to the recording of such pixels using a binary architectured printhead. As this term is used herein, it relates to known types of printheads wherein driver chips are provided with shift registers and latches for storing a single data bit for driving each LED for producing a single flash of light. The driver chips conventionally also include current driving circuitry for driving current to those LED's to be flashed during a period of time controlled by a strobe pulse timed by a suitable clock or by the presence of a data bit stored in a latch for driving the LED. While the LED is being driven or flashed in response to a data bit stored in the latch, a shift register on the driver chip may be receiving the next data bit for driving respective LED's for the next flash.

The binary architectured printheads may be distinguished from grey level architectured printheads wherein the driver chips of the latter store the entire multibit signal for recording a pixel.

The desirability of using binary architectured printheads for grey level recording lies in their cost which is significantly less expensive than more complex grey level architectured printheads.

In U.S. application Ser. No. 07/521,511, U.S. Pat. No. 5,138,337 a binary architectured printhead is disclosed for recording grey level pixels. In employing such printheads, data needs to be formatted appropriately before sending individual data bits to the printhead. In formatting the data to the printhead, typically the data will first be stored in a page memory as a multibit grey level signal. The data is then extracted from page memory and may be required to be adjusted for process conditions as well as for correcting the data that needs to be reformatted for transmission to the printhead. A problem associated with the above where such adjustment and correction is required is the need for memory for the storing the data in the various stages.

It is an object of the invention therefore to minimize the memory requirements for manipulating data prior to sending same to a binary architectured printhead.

SUMMARY OF THE INVENTION

The above and other objects which will become apparent in reading the specification below are realized by a circuit for formatting data for transmission to a binary architectured printhead having a plurality of recording elements, said circuit comprising: buffer means for storing signals representing a line of pixel data with each pixel represented by a multibit grey level data signal of n binary bits, correction means for modifying said multibit data signal to a corrected multibit pixel printing data signal, means for outputting said multibit grey level data signal to the input of said correction means; multiplexer means for selecting one of the n data bits of said multibit signal for transmission to the printhead; and control means for repeating n times the output of said multibit grey level data signal of each pixel to said correction means.

The invention is further realized in a method for formatting data to a non-impact printhead for recording the printhead having a plurality of recording elements, the method comprising the steps of (a) storing signals in a buffer representing the grey level of a line of pixels to be recorded, the pixels each being represented by a multibit binary data signal of n bits; (b) outputting from the buffer the multibit signal representing a pixel grey level as one input to a correcting means; (c) inputting a second multibit signal representing a performance characteristic of a recording element to said correcting means; (d) generating a corrected multibit signal representing the time period for recording said pixel; (e) selecting a single bit from said corrected multibit signal and transmitting same to said printhead for recording; and repeating said steps (b) through (e) for each pixel in said line of pixels n times for each bit.

DETAILED DESCRIPTION OF THE PREFERRED EMBODIMENTS

The apparatus of the preferred embodiment will be described in accordance with an electrophotographic recording medium. The invention, however, is not limited to apparatus for creating images on such a medium, as other media such as photographic film, thermal sensitive, etc., may also be used with the invention.

Because electrophotographic reproduction apparatus are well known, the present description will be directed in particular to elements forming part of, or cooperating more directly with, the present invention. Apparatus not specifically shown or described herein are selectable from those known in the prior art.

Figure 1:
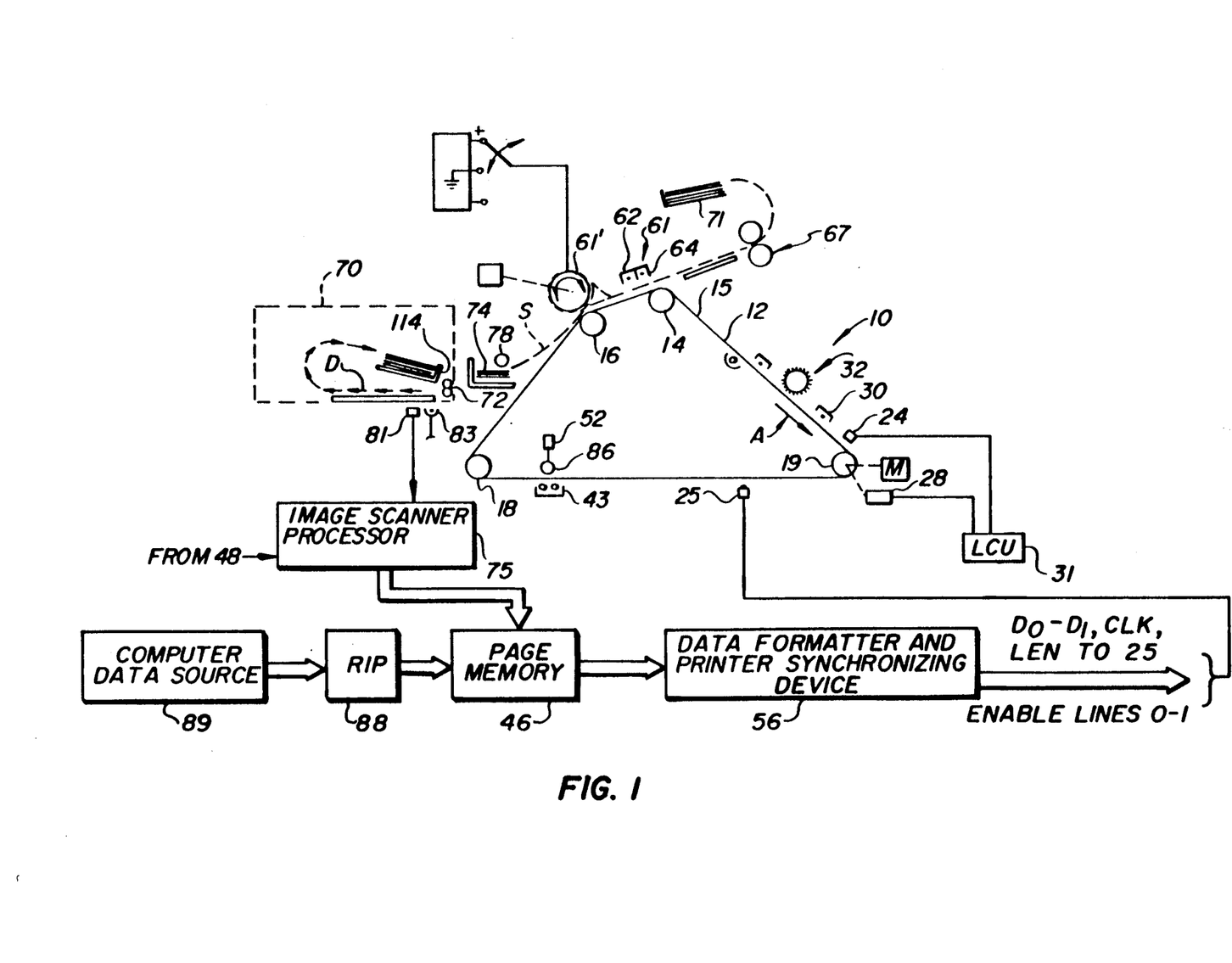
FIG. 1 is a schematic of a grey level printer apparatus made in accordance with the invention.

With reference now to FIG. 1, an electrophotographic reproduction apparatus 10 includes a recording medium or photoreceptor such as a photoconductive web 12 or other photosensitive medium that is trained about four transport rollers 14, 16, 18 and 19, thereby forming an endless or continuous web. Roller 19 is coupled to a driver motor M in a conventional manner. Motor M is connected to a source of potential when a switch (not shown) is closed by a logic and control unit (LCU) 31. When the switch is closed, the roller 19 is driven by the motor M and moves the web 12 in a clockwise direction as indicated by arrow A. This movement causes successive image areas or image frames of the web 12 to sequentially pass a series of conventional electrophotographic work stations of the reproduction apparatus.

For the purposes of this disclosure, several work stations are shown along the web's path. These stations will be briefly described.

First, a charging station 30 is provided at which the photoconductive surface 15 of the web 12 is sensitized by applying to such surface a uniform electrostatic primary charge of a predetermined voltage. The output of the charger may be controlled by a grid connected to a programmable power supply (not shown). The supply is, in turn, controlled by the LCU 31 to adjust the voltage level Vo applied onto the surface 15 by the charger 30.

At an exposure station an electrostatic image is formed by modulating the primary charge on an image area of the photoconductive surface with selective energization of point-like radiation sources in accordance with signals provided by a data source to be described. The point-like radiation sources are supported in a printhead 25 also to be described in more detail below.

A development station 43 includes developer which may consist of iron carrier particles and electroscopic toner particles with an electrostatic charge opposite to that of the latent electrostatic image. Developer is brushed over the photoconductive surface of the web 12 and toner particles adhere to the latent electrostatic image to form a visible toner particle, transferable image. The development station may be of the magnetic brush type with one or two rollers. Alternatively, the toner particles may have a charge of the same polarity as that of the latent electrostatic image and develop the image in accordance with known reversal development techniques. Where toner particles of other colors are also to be used, additonal stations for such colors will be provided. Typically, a color copier might include cyan, magenta and yellow color toner stations.

The apparatus 10 also includes a transfer station 61 shown with a pair of corona chargers 62, 64 at which the toner image on web 12 is transferred in register to a copy sheet S; and a cleaning station 32, at which the photoconductive surface of the web 12 is cleaned of any residual toner particles remaining after the toner images have been transferred. After the transfer of the unfixed toner images to a copy sheet S, such sheet is transported to a heated pressure roller fuser 67 where the image is fixed to the copy sheet S and the sheet is then transported to a tray 71. Suitable means, such as a transfer drum 61', may be provided for duplex operation in accordance with known techniques as well as for providing multicolor copies, as is also well known. See, for example, U.S. Pat. No. 4,791,450, the pertinent contents of which are incorporated herein by this reference.

As shown in FIG. 1, a copy sheet S is fed from a supply 74 by driver roller 78, which then urges the sheet to move forward onto the web 12 in alignment with a toner image.

To coordinate operation of the various work stations with movement of the image areas on the web 12 past these stations, the web has a plurality of indicia such as perforations along one of its edges. These perforations generally are spaced equidistantly along the edge of the web 12. At a fixed location along the path of web movement, there is provided suitable encoding means 24 for sensing web perforations. This sensing produces input signals into the LCU 31 which has a digital computer, preferably one or more microprocessors. The LCU has a stored program responsive to the input signals for sequentially actuating, then de-actuating, the work stations as well as for controlling the operation of many other machine functions. Additional encoding means 28 may be provided as known in the art for providing more precise timing signals for control of the various functions of the apparatus 10 as will be described below.

Programming of a number of commercially available microprocessors is a conventional skill well understood in the art. This disclosure is written to enable a programmer having ordinary skill in the art to produce an appropriate control program for the one or more microprocessors used in this apparatus. The particular details of any such program would, of course, depend on the architecture of the designated microprocessor(s).

Figure 2:
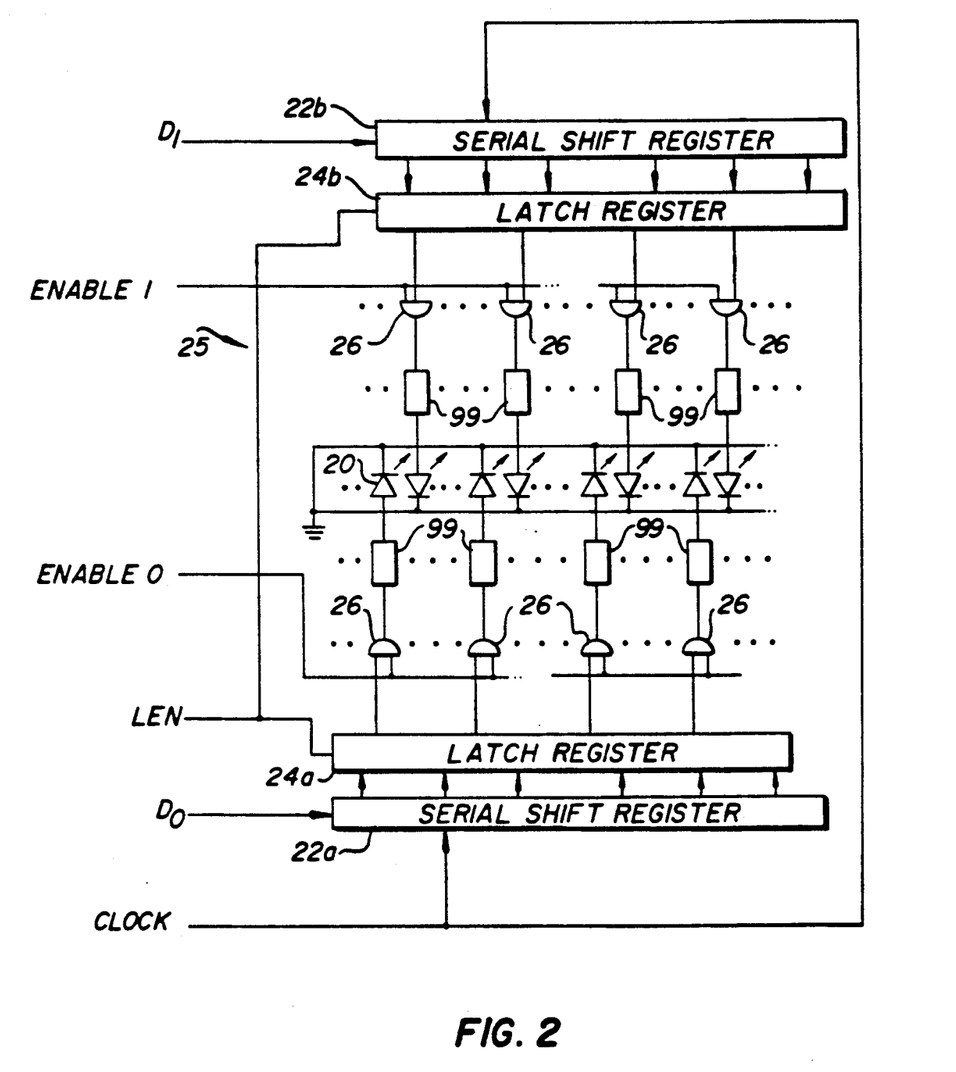
FIG. 2 is a block diagram of circuitry of a binary architectured printhead of the prior art and used in the printer apparatus of FIG. 1.

With reference to both FIGS. 1 and 2, the printhead 25, as noted, is provided with a multiplicity of energizable point-like radiation sources 20, preferably light-emitting diodes (LED's). Optical means (not shown) may be provided for focusing light from each of the LED's onto the photoconductive surface. The optical means preferably comprises an array of optical fibers such as sold under the name Selfoc, a trademark for a gradient index lens array sold by Nippon Sheet Glass, Limited. Due to the focusing power of the optical means, a row of emitters will be imaged on a respective transverse line on the recording medium.

With reference to FIG. 2, the printhead 25 comprises a suitable stationary support with a series of LED chip arrays mounted thereon. As is well known, each of the LED chip arrays includes, for example, 96 LED's arranged in a single row. These chips are also arranged end-to-end in a row and where twenty-seven LED chip arrays are so arranged, the printhead will extend across the width of the web 12 and include 2592 LED's arranged in a single row. To each side of this row of LED's there may be provided, for example, twenty-seven identical driver chips. Each of these driver chips include circuitry for addressing the logic associated with each of 48 LED's to control whether or not each of the LED's should be energized as well as current driver circuitry 99 to control the level of current to each of the LED's controlled by that driver chip. In this example, two driver chips are thus associated with each LED chip array. Each of the two driver chips will be coupled for driving of alternate LED's, i.e., one of the driver chips will drive the even numbered LED's and the other driver chip will drive the odd numbered LED's in a particular LED chip array. Thus, one driver chip will drive the 48 odd numbered LED's of the 96 LED's in the array and the other driver chip will drive the 48 even numbered LED's of these 96 LED's. Only some of the LED's are illustrated in FIG. 2, it being understood that many more LED's are present. The driver chips on each side of the printhead are suitably coupled together in groups to serially shift data between those in a group. Thus, shift register 22a represents the combination of the shift registers in 27 driver chips.

As may be noted in FIG. 1, the original document sheet to be copied D forms a part of a multisheet document supported in a recirculating feeder tray 70. A vacuum drive roller (not shown) under control of the LCU feeds the document D face down through metering rollers 72 which are adapted to feed the document D past an image scanning head 81 formed of say a conventional CCD array and provide signals to a conventional image scanner processor 75 indicative of the movement of the sheet. A lamp 83 provides a narrow line of illumination, upon the document D and reflections thereof off the document D are sensed by the image scanning array to provide signals indicative of density information thereon. This output of the image scanner array is also fed to the image scanner processor 75.

The data representing the scanned image on document D is processed by the image scanner processor in accordance with well known techniques and the output thereof is fed over to a page memory 46 wherein a page of rasterized data to be printed is stored. The printer apparatus may also include a raster image processor (RIP) 88 that rasterizes data from a computer 89 or word processor. This rasterized data represents the grey level of each pixel to be recorded and, in the case of a color copier or printer, may contain data bits indicating the color that it is to be printed in. This data, however, must be modified before printing so that it is modified for the particular process conditions of this printer and for the characteristics of the particular LED's that will be used to record the particular pixels of data.

In response to pulses from encoders 24 and 28 identifying a new image frame on a photosensitive web, the LCU provides an output signal via a memory controller to the Page Memory to remove one line of data. This data is fed to a printer output device 56 for formatting the data and synchronizing the operation thereof. This output device is illustrated by the data formatter and printer synchronizing device 56.

Figure 4:
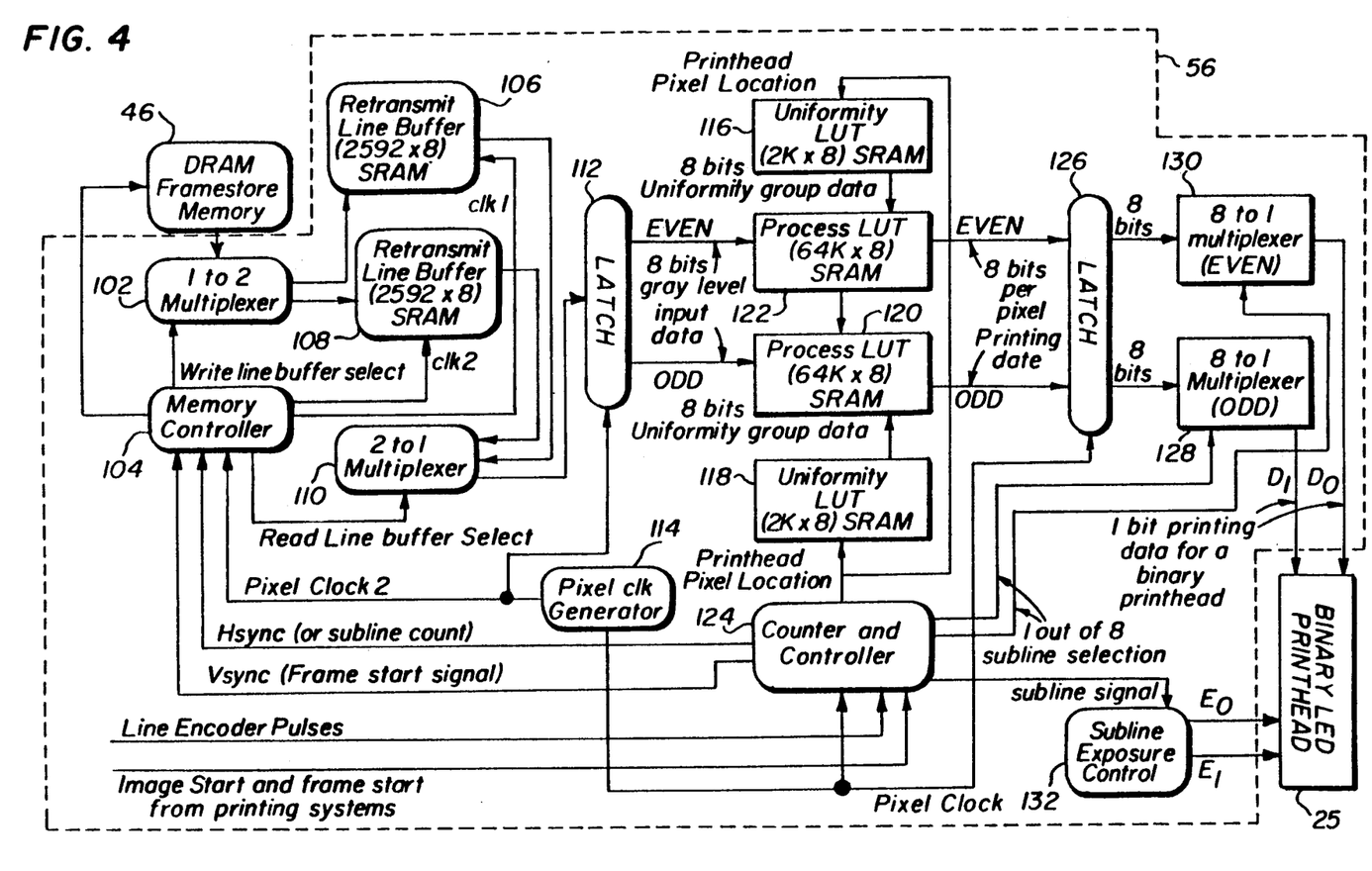
FIG. 4 is a block diagram of a circuit for formatting data to the printhead of FIG. 2 for operation in accordance with the invention.

With reference now to FIG. 4, the LCU may be programmed to remove rasterized data from the page or framestore memory 46 by "pulling" two 8-bit words at a time representing grey level data for two pixels.

This rasterized data represents information in multibit digital form for each pixel. But where the data is required to be modified to the specific printer, further modifications to the data will be made as discussed below before sending same to the printer.

This data is stored in one of two re-transmit line buffers 106, 108 in response to signals from a memory controller 104. A multiplexer 102 controls which of the buffers is operative to store the particular line of pixel data. Eventually, one line of pixel data is stored in the buffer, say buffer 106, and the next line of data is then stored in the other buffer 108. The storage of the data in each of the buffers is such that they are in an order that they can be clocked out last pixel first, i.e., the two 8-bit words for the last and the next to the last LED's on the printhead are clocked out first, while the two 8-bit words for the first and second LED's of the printhead are clocked out last. A second multiplexer 110 controls which of the line buffers outputs are to be transmitted to a 16-bit latch 112. Clock pulses (Clk1, Clk2) for clocking out the data from the buffers 106, 108 may be synchronized with the encoder of the printhead while the clock pulses for loading the data into the buffers are synchronized or controlled by a system clock. This approach allows data movement directly to the printhead in synchronization with the movement of web 12 which may vary due to changes of speed; i.e., flutter, etc. When the latch 112 receives the two 8-bit signals, it is then shifted to the output thereof wherein each 8-bit word provides an address in a corresponding process look-up table 120, 122 of a 64K×8 SRAM. A further respective 8-bit address is provided to each look-up table 120, 122 by a uniformity look-up table 116, 118 which defines the brightness characteristic for the particular LED that is to print that particular pixel. Note in the example provided herein that odd and even pixel data are handled simultaneously with the data representing the adjacent odd and even pixels. A pixel clock generator 114 provides pulses to a counter and controller 124. The output of the counter 124 represents the pixel location of a particular pair of adjacent LED's. The initial count may represent simultaneously the last odd and even LED's. This count is then input into each of two uniformity look-up tables 116, 118 which stores correction data for that particular LED of that pair as an 8-bit word representing 256 levels of correction. The two 8-bit outputs of the two process look-up tables 120, 122 are then latched in latch 126.

Figure 5:
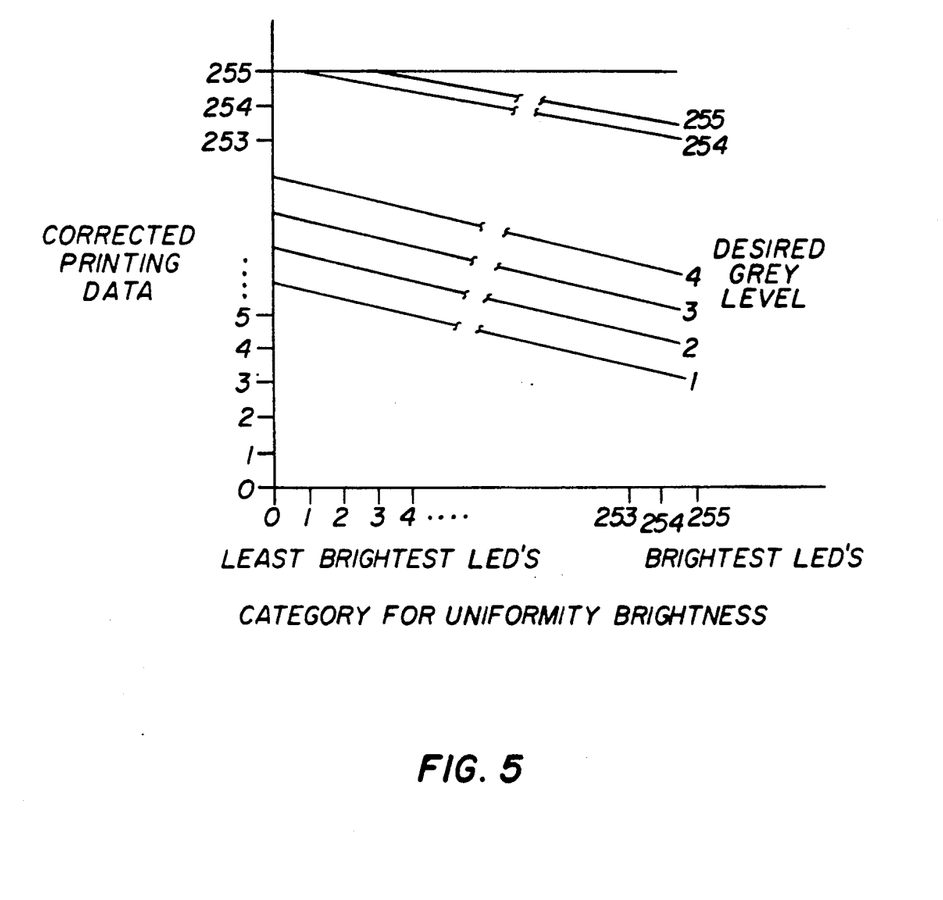
FIG. 5 is a diagram illustrating operation of the process look-up table in FIG. 4.

As may be seen in FIG. 5, which represents a graphical explanation of the contents of the process look-up tables 120, 122, the 8-bit word representing uniformity correction can represent a grading of the LED's into 256 categories according to their respective brightness levels. As is known even though the same current be driven through each LED, LED's respond differently and their light outputs vary. Some may be brighter than others with the very brightest being assigned category 255 and the least brightest being assigned category 0. Each 8-bit data signal from latch 112 identifies which desired grey level line is to be used to determine the corrected printing data. The 8-bit corrected pixel print data is then known once the category for the particular LED is identified and the grey level for the uncorrected grey level data is known.

The table 122 provides a reasonable approximation for correction. In theory, the desired grey level of exposure, $C_j$, for grey level "j" should be in accordance with the following equation $B_i \times T_{ij} = C_j$ where $B_i$ is the brightness of a particular LED "i" and $T_{ij}$ is the required exposure time for an LED of brightness $B_i$ to form an exposure $C_j$. The grey levels $C_j$ may be noted empirically by recording with each LED and identifying the time period $T_{ij}$ required to record each of the various grey levels. The LED's can then be grouped into appropriate categories of brightness and a look-up table memory created to approximate the print duration by assigning an 8-bit corrected printing data signal for each grey level for each of the particular categories or groups of brightness to which LED's have been assigned.

Figure 3A:
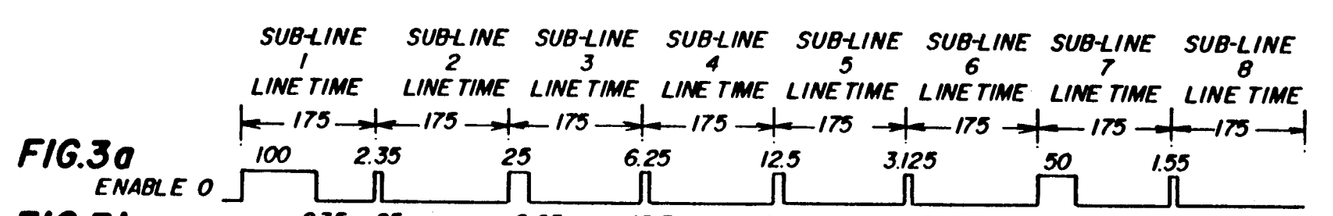
FIGS. 3a and 3b are timing diagrams illustrating strobe pulse signals on the binary architectured printhead of FIG. 2 but illustrating operation as a grey level printer during eight sub-lines of recording.
Figure 3B:
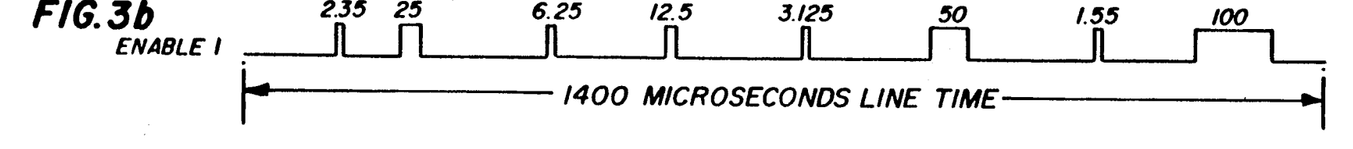

The two 8-bit words latched by the latch 126 represent the corrected exposure times for one odd and one even LED for recording a single pixel by each. Each of the latched 8-bit words are output from the latch 126 to a respective 8 to 1 multiplexer 128, 130 which selects one of the 8-bits from each word in accordance with a signal from the counter and controller 124. For each subline a different one of the 8-bits is selected by each of the 8 to 1 multiplexers 128, 130 in accordance with a change in a respective 3-bit count signal from the counter and controller 124. For each subline, the re-transmit line buffer 106, 108 transmits the same line of data in 16-bit word increments and this entire line of pixel data is re-transmitted eight times with the grey level input data for each pixel being corrected each time and transmitted to the latch 126. Since the enable lines (see FIGS. 2 and 3a, b) have a different sequence of exposure, the signals from the counter and controller 124 to the respective 8 to 1 multiplexer 128, 130 will be different to select a different order of bits from the odd and even pixel data.

Each of these one-bit data signals is carried over respective lines, indicated in FIG. 2 by data lines $D_0 - D_1$, and is fed under clock control to an appropriate serial data shift register 22a, 22b until 2592 bits of data, one for each of the LED's, is stored in the serial registers for the odd and even numbered LED's. Upon a latch enable (LEN) signal from the LCU, the data is shifted in parallel to latch registers 24a, 24b, enabling the next sub-line of data to be introduced into the serial shift registers 22a, 22b. In response to an encoder pulse or other suitable pulse indicating the timing for firing the next sub-line for printing, the counter 124 provides a series of timed strobe signals over lines Enable 0 and Enable 1.

The strobe signals are provided by the counter and controller 124 as are a series of sublines dividing each line into equal time periods through generation of Hsync pulses, over the enable lines Enable 0, Enable 1 as shown in FIG. 3. It will be noted from this timing diagram that a relatively long pulse such as the 100ms pulse on strobe line Enable 0 (sub-line 1) is followed by a shorter duration pulse on strobe line Enable 1 during sub-line #1. It may be noted that the pulse durations are generally binary weighted in time duration with the lowest exposure durations being increased to avoid exposure times that are too short for activating LED's which have minimum rise time and fall time requirements.

In U.S. application Ser. No. 07/521,511 and now U.S. Pat. No. 5,138,337, there is disclosed the use of 4 enable lines wherein during a subline of exposure, the even-numbered LED's on the first half of the printhead are enabled, then the even-numbered LED's on the second half of the printhead, then the odd-numbered LED's on the first half of the printhead and then the odd-numbered LED's on the second half of the printhead. Heating of the printer due to current pulsing of the LED's is minimized with this arrangement. In addition, the straightness of a printed line in the cross-track (main scanning) direction can be ensured since there will only be 1/2400" separation between a line of recorded sub-pixels formed in one-half of the printhead versus a line of sub-pixels recorded in a second half of the printhead. In the embodiment of the invention, a further advantage of mixing the enable times of the odd and even pixels results in better straightness compared with enabling one-half of the printhead at one time and then the second half at another time. Furthermore, the order of the sub-line exposures as indicated in FIG. 3, both for exposures in the in-track direction (successive exposures by one LED using say strobe line Enable 0) and cross-track direction will help the sub-pixels' process stability by intermixing high exposure sub-pixels with low exposure sub-pixels adjacent to it.

The strobe lines Enable 0, Enable 1 are fed to one input of a respective logic AND gate 26 associated with each LED. The other input of AND gate 26 is provided with a data bit from the latch register representing whether or not a sub-dot or sub-pixel is to be printed at this time. Assuming a sub-dot is to be printed, a respective LED is enabled for a time period predetermined by the strobe signal for that sub-line. In this regard, enablement of an LED 20 comprises driving of current through the LED by for example a transistor controlled current driver 99 of conventional circuitry to cause the LED to generate illumination.

The invention has been illustrated with regard to a printhead having a plural number N of point-like recording elements (LED's) per inch exemplified by the N=300 dpi printhead described herein and a control for exposing M lines (M=300 dpi) of grey level pixels per inch in the sub-scanning direction by use of L sub-lines, exemplified by L=8, for each grey level pixel. Thus, encoder signals are provided at the rate of 1/300 per inch and are further divided by the counter and controller 124 to 1/2400 per inch ($1.64 = 10^{-4}$cm) of travel of the web 12 for recording P=L×M (2400 in this example) sub-lines per inch in the sub-scanning direction. One can even use coarser encoder pulses like 100 per inch and generate the finer pulses with a phase lock loop (PLL). The purpose is to reduce flutter by synchronization to get rid of the low frequency transport noise.

The exposure durations during the sub-lines for recording a grey level pixel are mixed between large and then followed by relatively shorter duration exposures which contribute to electrophotographic process stability. Thermal problems are minimized by reducing current requirements to the printhead through staggering of the enablement times during each sub-line exposure period. The duration of each sub-line exposure period is kept uniform to simplify the clocking of data to the printhead yet the duration of each sub-line exposure period is of relatively short duration. The advantages of grey level printing using an inexpensive binary printhead are thus inexpensively and efficiently realized.

The specific exposure times and resolution dimensions identified numerically are provided as exemplary and, of course, may be optimized for the appropriate printhead. As has been shown, exposure correction to compensate for non-uniformities in the LED's or drivers may be accomplished through modifying of data for each LED at each grey level. The advantages of process stability are attained even where the exposures for the sub-lines are concurrent.

While the invention has been illustrated in connection with an electrophotographic apparatus, other non-impact dot matrix printers such as thermal, electrographic, etc. may also make use of the invention described herein.

The encoder means may be of the type described herein, wherein each line of printing is "tracked" relative to actual photoconductor movement or wherein an encoder signal is "tracked" at the beginning of each frame and pulses artificially created for each line in accordance with approximate photoconductor movement. Alternatively, the encoder may provide pulses at each sub-line interval.

Still other variations may include the use of say 6-bits per pixel data with an addition of two color internal bits for cyan, magenta, yellow, black to form the 8-bits grey level input data so that one process look-up table can be used for all four colors in a color printer printing with those respective colored toners. A further extension may be the loading of the process look-up table with updated data based on changes in process conditions such as humidity which effects development of the electroscopic toners. This can be done, without changing the uniformity look-up table which is specific printhead-related and can be a plug in ROM. With the use of RAM type memories for the uniformity look-up table 118, changes can be made to it based on measured thermal gradients on the printhead. A further flexibility to the system described herein is that a different bit depth grey level value from 4-bits to 8-bits per pixel per color can be used, depending upon how much DRAM memory is provided for the framestore or page memory 46.

Still further modifications may include having all the driver chips to one side of the line of LED's and streaming data serially a single data bit at a time as described above but with the data bits for odd and even LED's being one right after the other. Two enable times are described above for enabling odd and even LED's separately in time could still be provided to limit current to the printhead. In such an example, each driver chip would have suitable circuitry for receiving two strobe enable lines, one for odd-numbered LED's and the other for even-numbered LED's driven by that driver chip. The advantage to this is in eliminating the extra 8 to 1 multiplexer as well as only requiring one set of uniformity and process look-up tables with need for only 8-bit latches.

The invention will also be useful in a system where 32 bits rather than 16 are handled simultaneously. In such a case, the multiplexer would access data for high-numbered LED's odd and even and for low-numbered LED's odd and even in one 32-bit transfer rather than the 16-bit described herein.

The invention has been described in detail with particular reference to preferred embodiments thereof, but it will be understood that variations and modifications can be effected within the spirit and scope of the invention.

What is claimed is:

1. A non-impact printing apparatus for recording, the apparatus comprising:
a binary architectured printhead including a plural number of recording elements and an equal plural number of respective data registers, each of said registers storing a single data bit to determine whether or not a respective one of said recording elements is enabled for recording during a subline recording period of a portion of a respective grey level pixel;
enabling means for enabling recording of each said grey level pixel by enabling said respective one of said recording elements to record said respective pixel during plural sub-line recording periods;
data formatting means for organizing image data for transmission to said registers, said formatting means including frame store memory means for storing signals representing a plurality of lines of image pixel data forming a complete image frame of said image pixel data, each said grey level pixel being represented by a signal of plural binary bits, selection means for sequentially selecting said lines of said image pixel data in said frame store memory means to sequentially enable output of a selected one of said lines of said image pixel data from said frame store memory means wherein said image pixel data for two adjacent pixels of said selected ones of said lines of said image pixel data are simultaneously selected and output from said frame store memory means by a controller, first buffer means for storing said selected one of said lines of said image pixel data output from said frame store memory means, look-up table correction memory means for outputting respective corrected multibit pixel printing data that modifies respective image pixel data wherein each of the respective corrected data is a signal of n binary data bits (with n being a number greater than one), counter means for generating a count signal identifying said one of said recording elements, first memory means responsive to said count signal and storing respective signals related to characteristics of said one of said recording elements for outputting a first signal representing a characteristic of said one of said recording elements, means coupling said first buffer means and said first memory means to said correction memory means for inputting said image pixel data and said first signal representing a characteristic of said one of said recording elements as address inputs to said correction memory means to identify a memory location in said correction memory means, latch means for latching said respective corrected multibit data output from said correction memory means, multiplexer means for transmitting one of n data bits of the corrected multibit data stored in said latch means to a respective one of said registers, and said controller including means for controlling said coupling means to repeat n times the input of said image pixel data of each said pixel to said correction memory means, means for controlling said latch means to latch n times the output of the respective corrected multibit data from said correction memory means and means for controlling the multiplexer means to transmit to a respective register a different one of the n data bits for use in recording a respective pixel by said one of said recording elements.

2. The apparatus of claim 1 and wherein said recording elements are light emitting diodes.

3. The apparatus of claim 2 and wherein said enabling means enables adjacent ones of said recording elements for recording so that said adjacent ones of said recording elements are not enabled simultaneously during a sub-interval recording period.

4. The apparatus of claim 1 and wherein said enabling means includes means for staggering recording durations during a sub-interval of recording pixels so that certain of said recording elements are not on simultaneously.

5. The apparatus of claim 1 and wherein said first signal represents a characteristic of two adjacent recording elements of said recording elements.

6. The apparatus of claim 1 and wherein said formatting means includes a second buffer means for storing data representing grey levels of a second line of pixels to be recorded.

7. The apparatus of claim 6 and wherein said formatting means includes second multiplexer means coupled to said first and second buffer means for selecting the output of one of said first and second buffer means for input to said correction means.

8. The apparatus of claim 1 and wherein the correction memory means stores correction data in accordance with a color of a print to be printed.

* * * * *